United States Patent [19]

Spencer

[11] E Re. 29,022

[45] Reissued Nov. 2, 1976

[54] SELF-FLUSHING IRRIGATION VALVE

[76] Inventor: Lloyd Spencer, 220 Patrician Way, Pasadena, Calif. 91105

[22] Filed: Dec. 20, 1974

[21] Appl. No.: 534,745

Related U.S. Patent Documents

Reissue of:

[64] Patent No.: 3,767,124
Issued: Oct. 23, 1973
Appl. No.: 245,312
Filed: Apr. 19, 1972

[52] U.S. Cl. ..... 239/542; 138/45; 239/107; 239/547

[51] Int. Cl.[2] ..... B05B 15/02

[58] Field of Search ..... 239/106–111, 239/542, 547, 569, 570; 138/44, 45, 46

[56] References Cited

UNITED STATES PATENTS

| | | | |
|---|---|---|---|
| 2,515,073 | 7/1950 | Binnall et al. | 138/45 |
| 2,764,183 | 9/1956 | Gollehon | 138/45 |
| 2,781,061 | 2/1957 | Frey | 138/45 |
| 2,829,674 | 4/1958 | Segelhorst et al. | 138/45 |
| 3,203,629 | 8/1965 | Goddard | 239/108 |
| 3,268,172 | 8/1966 | Goyette | 239/109 |
| 3,685,735 | 8/1972 | Foster | 239/109 |
| 3,693,888 | 9/1972 | Rondas et al. | 239/547 X |

*Primary Examiner*—John J. Love
*Assistant Examiner*—Michael Mar

[57] ABSTRACT

A self-flushing irrigating valve formed, at least in part, of an elastically deformable material which, when subjected to differential pressures below a preselected value, occupies an open position forming a passage for the flushing of water therethrough; and when subjected to differential pressures above a preselected value, forms a constricted passage for trickle flow of water therethrough. The valve, when in its trickle flow condition, tends to effect further constriction on further increase in differential pressure thereby tending to produce a uniform flow rate through a range of effective pressures.

22 Claims, 31 Drawing Figures

SELF-FLUSHING IRRIGATION VALVE

Matter enclosed in heavy brackets [ ] appears in the original patent but forms no part of this reissue specification; matter printed in italics indicates the additions made by reissue.

A rapidly developing form of irrigation is known as drip or trickle irrigation. Its advantages are substantial and are noted as follows:

1. It uses much less water than other irrigation systems.
2. There is a minimal waste of the water used.
3. The water is applied rather precisely in the area needed to minimize weed growth and in amounts which avoid excessive wetting of surrounding soil to permit machine cultivation without compaction of wetted soil.
4. It permits efficient use of liquid pesticides, fumigants and fertilizer in the system.

However, its disadvantages are also substantial and are noted as follows:

1. The water must be supplied through a multitude of minute openings of only a few thousandths of an inch in diameter, one or more for each plant, which are easily clogged by equally minute particles, either mineral or organic.
2. To reduce clogging problems, expensive filtering equipment is required.
3. Low pressures are required across the openings to increase the usable size and yet produce drip or trickle flow. This complicates the problem of uniform distribution of water to the plants. Also, low pressures and attendant non-turbulent flow tend to promote growth of slime in the system which aggravates the clogging problem.
4. Attempts have been made to provide a flushing cycle which will clean the drip of trickle openings; however, because of the enormous number of such openings to be flushed, this solution has, heretofore, been excessively expensive.

SUMMARY OF THE INVENTION

The present invention is directed to an inexpensive, but effective, self-flushing valve adapted to use in an irrigation system, and is summarized as follows:

First, to provide a self-flushing irrigating valve which is so inexpensive that one may be provided for each drip or trickle opening.

Second, to provide a self-flushing valve which may be mounted in any position and which, when subjected to differential pressures below a preselected value, forms an open passage dimensioned to permit flushing of particulate matter, or which, when subjected to differential pressures above a preselected value, closes to form a passage dimensioned to effect drip or trickle flow.

Third, to provide a self-flushing valve which, by choice of an elastomeric or rubber-like material having preselected physical properties and dimensions such as wall thickness the valve can be designed to have a predetermined rate of drip or trickle flow; for example, if desired, the rate of flow may be held to a gallon per hour or less or arranged to flow at several gallons per hour.

Fourth, to provide a self-flushing valve, which may be so arranged that, after assuming its drip or trickle flow state, tends to flow at near a constant rate throughout a wide range of pressures.

Fifth, to provide a minimal cost a self-flushing valve which may be arranged as a single piece multiple orifice valve element, permanently connected housing members and small diameter distributor tubes extending from the valve to points of discharge.

Sixth, to provide a self-flushing valve as indicated in the preceding object which, with a minimal number of parts, may be arranged for mounting on a riser with distributor tubes extending downwardly, then laterally from the riser; or may be arranged at an end of a supply line for extension of the distributor tubes beyond the line; or interposed in a supply line to extend different distances along the line or laterally therefrom.

Seventh, to provide a self-flushing valve wherein several embodiments thereof provide elastomeric tubes normally forming a passage dimensioned to permit flushing flow of water, and capable of constricting in response to a predetermined differential pressure to collapse the passage to a few thousandths of an inch, thereby to cause drip or trickle flow.

Eighth, to provide a self-flushing valve structure, an embodiment of which a wall of the housing forms a series of fixed walls each cooperating with complementary elastomeric walls to form a series of self-flushing valves.

Ninth, to provide a self-flushing valve, an embodiment of which has a ported valve face and a flap member normally clearing the valve face for flush flow of water, the flap member being subject to differential water pressure to close upon the disk and form therewith a drip or trickle passage.

Figure 1:
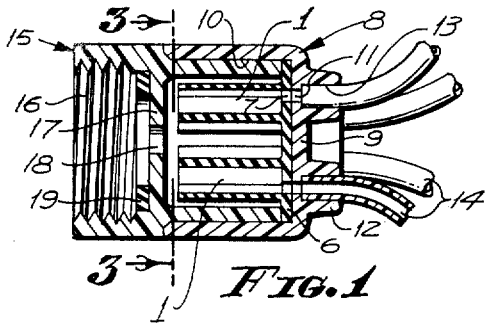
FIG. 1 is a longitudinal sectional view showing an assembly of one embodiment of the self-flushing irrigating valve.

The term "trickle" used herein to describe flow from the self-flushing valve is intended to include "drip"; that is, under trickle flow condition the valve may be designed to discharge water at a fraction of a gallon per hour, or may be designed to discharge water at several gallons per hour.

Reference is first directed to the embodiment shown in FIGS. 1 through 8. Each self-flushing valve 1 herein illustrated is formed of elastomeric material, the specifications of which may vary to meet specific conditions of use. The self-flushing valve is tubular and, in the construction illustrated, is essentially triangular in cross section forming three side walls 2 which define obtuse V's 3 and are joined by acute apices which, externally, may be rounded as indicated by 4, but internally, preferably form relatively sharp apices 5. Also, internally the obtuse V's 3 are preferably sharp in their normal condition as it seems this produces a lower trickle flow rate, as will be described later.

A set, in this case six, self-flushing valves are molded in a ring and extend in parallel relation from an integral, common disk 6. The disk is provided with a set of outlet apertures 7 centered with respect to each corresponding valve. While the angle defined by each obtuse V 3 may vary, an included angle of 150° seems adequate. If the radius of each apex 5 is one-eighth inch, the circular space defined by the apices 3 is approximately one-sixteenth inch in diameter, quite adequate for self-flushing operation.

Figure 2:
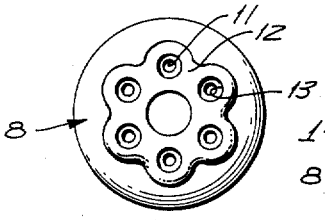
FIG. 2 is an end view thereof with the distributor tubes omitted.
Figure 3:
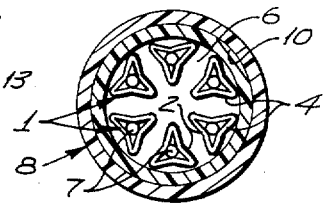
FIG. 3 is a transverse sectional view thereof taken through 3—3 of FIG. 1 with the self-flushing valves shown in end elevation.

Referring to FIGS. 1, 2 and 3, the set of self-flushing valves is received in a cup shaped housing member 8 having a flat end wall 9 and a cylindrical side wall 10. The end wall is provided with a ring of outlet apertures 11 which are aligned with the apertures 7 and are, preferably, the same diameter. Externally, the end wall is provided with an extension 12 having sockets 13 of larger diameter than the apertures 11 and registering therewith. The sockets receive distributor tubes 14 which may be cemented therein. Extruded plastic tubing about one-eighth inch in outside diameter and providing a bore about one-sixteenth inch in diameter is suitable.

The construction shown in FIGS. 1, 2 and 3 may be used at the end of a garden hose. For this use a second housing member 15 is provided having an internally screwthreaded end 16 to receive a hose fitting and terminating at a partition 17 having a central aperture 18 and supporting a washer 19. Beyond the partition, the housing member 15 is reduced in diameter to fit within the wall 10 of the housing member 8 and engages the periphery of the disk 6. The housing members are preferably formed of plastic material which may be joined by cement. Should it be desired, however, the housings may be joined by a screwthread connection. Also, in place of the screwthreads 16, the housing member 15 may be arranged for connection by an adhesive to a conventional plastic pipe.

Figure 4:
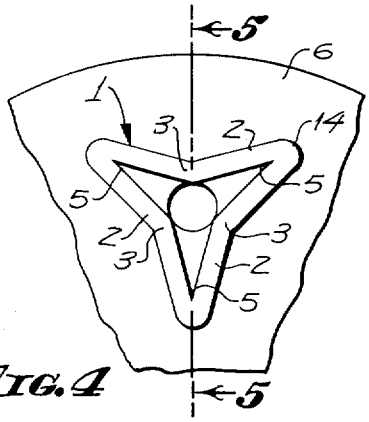
FIG. 4 is an enlarged end view of one of the self-flushing valves in its normal or flushing condition.
Figure 5:
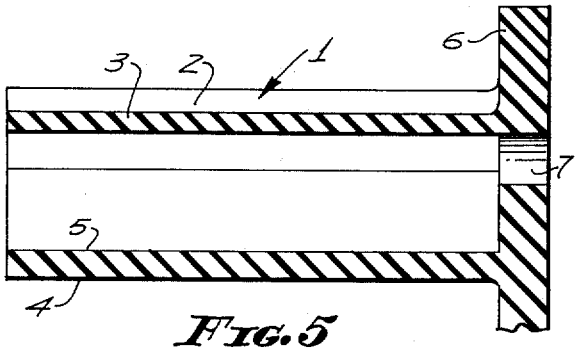
FIG. 5 is a longitudinal sectional view thereof taken through 5—5 of FIG. 4.
Figure 7:
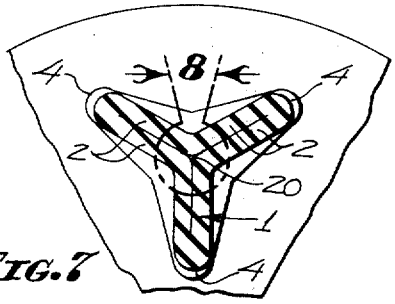
FIG. 7 is a transverse sectional view taken through 7—7 of FIG. 6 also showing the trickle condition.
Figure 6:
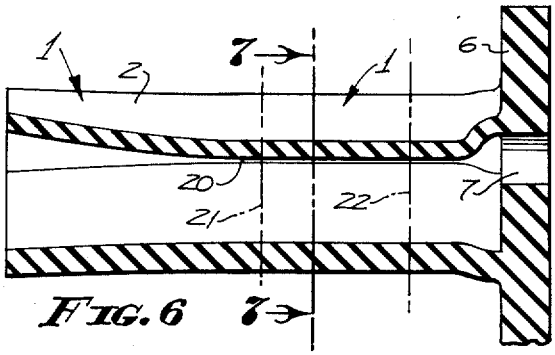
FIG. 6 is a longitudinal sectional view corresponding to FIG. 5 showing the valve in its collapsed or trickle condition.
Figure 8:
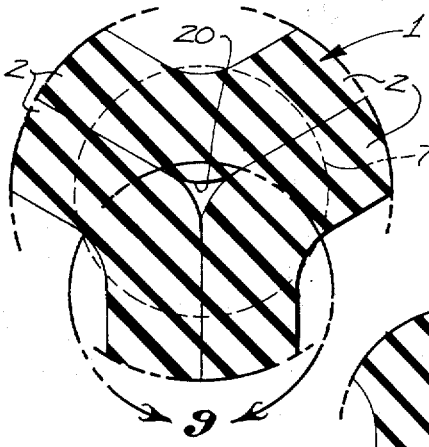
FIG. 8 is a further enlarged fragmentary sectional view taken within circle 8 of FIG. 7 showing particularly the portions forming the trickle bore.

Operation of the self-flushing irrigating valve is as follows:

When the water supply is shut off, the self-flushing valve assumes the flushing condition shown in FIGS. 4 and 5. When the water is first turned on, the valve remains in its flushing condition until the water pressure reaches a preselected value whereupon the valve suddenly collapses, as indicated in FIGS. 6 and 7, to form a trickle passage 20 as indicated in FIGS. 7 and 8, in idealized form. The walls of the trickle passage are formed in the region of the apices 3; however, some stretching takes place in this region obliterating the initial sharp edge.

The size of the trickle passage depends on several factors, such as:

1. The physical properties of the elastomeric material comprising the valve. Highly flexible soft material having low shore harness will form a smaller passage than a material having greater shore hardness. It is well known that rubber, synthetic rubber and elastomeric plastic materials may be compounded to provide a wide range of properties. For example, a soft material may produce a trickle flow of a half gallon per hour;

whereas a less soft material may produce a trickle flow of several gallons per hour.

2. The wall thickness of the valve.

3. The length of the valve. Longer valves do not collapse throughout their length; that is, their outer ends may remain open as indicated in FIG. 6. However, if the length is shortened so as to terminate at line 21 or 22 in FIG. 6, the end itself will be in a collapsed state.

Once the valve has collapsed to its trickle flow condition, some further compression will occur depending on the pressure causing the valve to take on the characteristics of a constant flow valve. Stated otherwise, at any pressure above the critical pressure at which the valve collapses to its trickle flow condition, the flow tends to compensate for pressure change. The tendency is toward increase in flow with decrease in pressure. However, by proper choice of the physical properties of the material comprising the valve, a virtually constant flow condition is feasible.

The embodiment of the irrigating assembly as shown in FIGS. 1, 2 and 3 is coupled to a hose and the distributor tubes, which may be of different length, are placed so as to terminate adjacent corresponding plants. If required, a pair or more of distributor tubes may water a single plant. As the flow may be essentially constant, the volume of the water received is proportional to the length of time of the irrigating cycle irrespective of pressure, thus eliminating the different flow rates due to difference in elevation.

Figure 9:
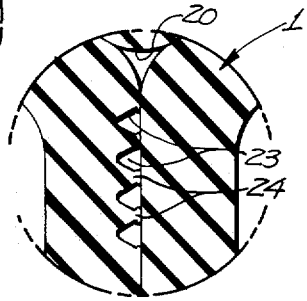
FIG. 9 is a similar enlarged fragmentary sectional view taken within circle 9 of FIG. 8.

Reference is now directed to FIG. 9. To increase the rate of flow under trickle conditions, appropriate portions of the mutually engaging inner surfaces of the valve walls 2 may be provided with one or more minute grooves 23. To aid in producing a constant flow condition, the side margins of each groove may project from the wall surface and thus tend to crush, as indicated by 24, reducing the effective area of the groove as external pressure if increased. If desired, the apices 5, which tend to become rounded when the valve is in its drip or trickle condition, may have complementary projections which fill the trickle passage 20, or nearly so, so that the grooves 23 become the principal trickle passages.

Figure 10:
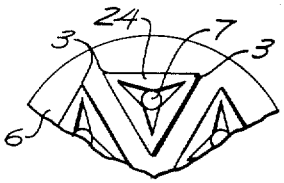
FIG. 10 is an enlarged fragmentary end view showing a modified embodiment of the self-flushing valve.

Reference is now directed to FIG. 10. If for any given shore hardness of the elastomeric material, a larger drip or trickle passage is desired, each wall may be increased in thickness toward its midline as indicated by 24. If the side margins or apices 3 are not increased in thickness, this can be accomplished without appreciable change in the critical pressure at which the valve collapses to its trickle condition.

Figure 11:
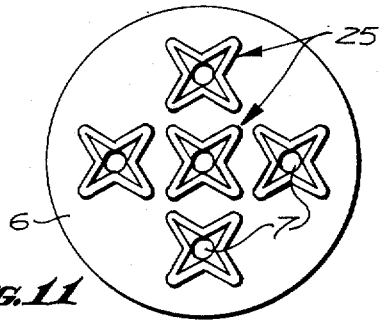
FIG. 11 is an enlarged end view showing another embodiment of the self-flushing valve.

Reference is now directed to FIG. 11, which discloses a four-sided self-flushing valve 25 which functions essentially the same as the valve 1. While the number of sides could be further increased, the area of each side is reduced for a given overall size tending to reduce its sensitivity to pressure.

Figure 12:
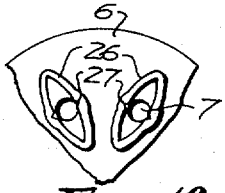
FIG. 12 is a fragmentary end view of a further embodiment of the self-flushing valve shown in its flushing condition.
Figure 13:
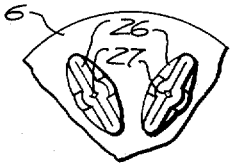
FIG. 13 is a similar fragmentary end view showing the valve in its trickle condition.

Reference is now directed to FIGS. 12 and 13, which disclose a two-sided self-flushing valve 26. In this case, the walls are normally convex and collapse to a mutually engaging flat condition. In order to provide a trickle passage, one or both surfaces may be provided with a channel 27. More than one channel may be provided and have normally protruding marginal walls capable of being resiliently compressed, as indicated in discussing FIG. 9, so as to provide an essentially constant flow. A two-sided valve 26, made of the same material as the valve 1, tends to close to drip or trickle flow condition at a lower critical pressure. While the walls of the valve 26 are shown as curved, they may comprise angularly related flat portions in the manner of the walls 2.

Figure 14:
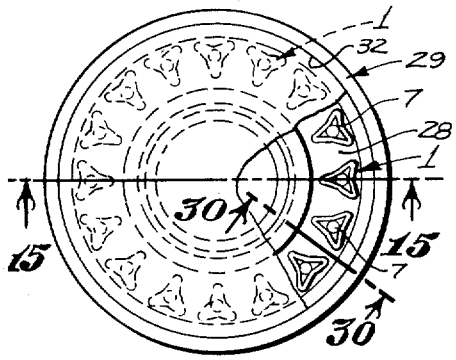
FIG. 14 is an end view of a modified assembly of the self-flushing irrigating valve with a portion in section.
Figure 15:
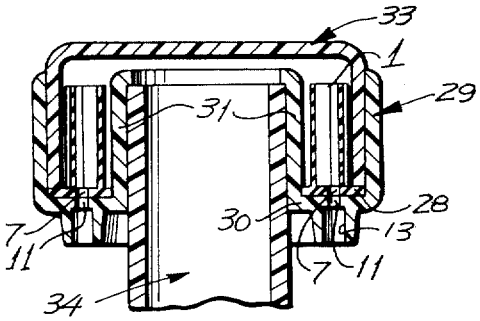
FIG. 15 is a longitudinal sectional view thereof taken through 15—15 of FIG. 14 as it appears joined to the end of a riser.

Reference is now directed to FIGS. 14 and 15. If a greater number of self-flushing valves 1, 24 or 26 is desired in an assembly, they may extend from a ring 28 of the desired diameter and having appropriately located apertures 7. For purposes of illustration, a ring of sixteen valves is illustrated. The ring fits within an annular housing 29 having an end wall 30, a radially inner wall 31 and a radially outer wall 32. As in the first described embodiment, the end wall 30 is provided with a ring of outlet apertures 11. Also, the end wall 30 includes an annular extension 12 having sockets 13 of larger diameter than the apertures 11 so as to receive distributor tubes, similar to the tubes 14.

The housing 29 receives a cover 33 having a cylindrical wall which fits inside the outer wall 32 and is cemented thereto. Within the inner wall 31 is fitted and cemented a plastic riser tube 34 for connection to an irrigation system. In this case the distributor tubes extend downwardly along the riser tube, then radially to the desired points of discharge.

Figure 16:
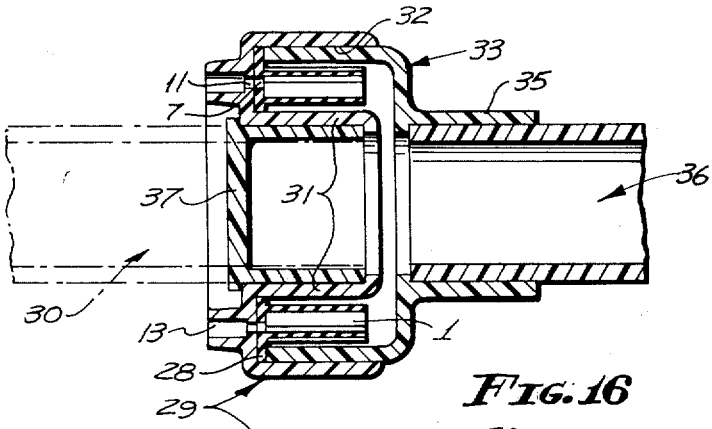
FIG. 16 is a longitudinal view thereof modified to fit at the end of a horizontal supply line for disposition of distributor tubes in extended relation, and indicating by broken lines the manner in which it may be installed intermediate the ends of a supply line.
Figure 17:
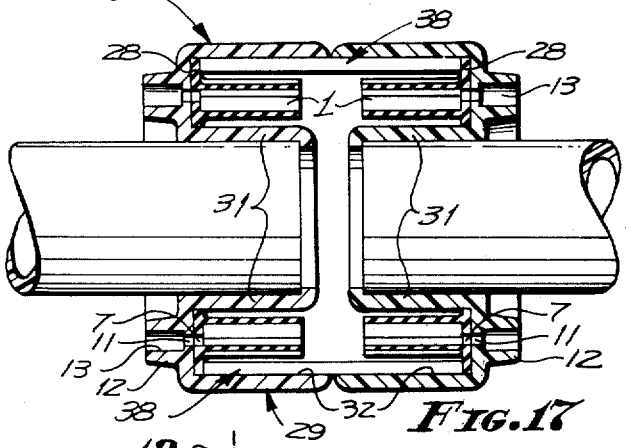
FIG. 17 is a longitudinal sectional view thereof also arranged for installation intermediate the ends of a supply line wherein the number of self-flushing valves are doubled.

If it is desired to arranged distributor tubes so as to extend beyond the supply tube, the cover 33 may be provided with a tubular extension 35 into which a supply tube 36 may be cemented, as shown in FIG. 16, and the inner wall 31 may be closed by a plug 37. If the assembly is desired to be used intermediate the ends of a supply line, a second tube 36 may be substituted for the plug 37 as indicated by broken lines in FIG. 6. Still further, two housings 29 may be placed end-to-end and connected by a sleeve 38, as shown in FIG. 17.

Figure 19:
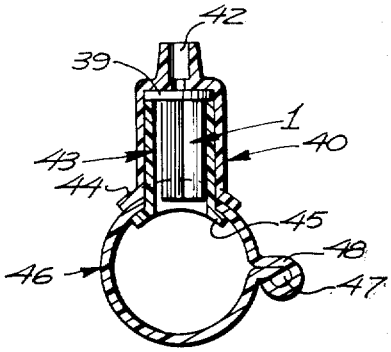
FIG. 19 is a transverse sectional view thereof taken through 19—19 of FIG. 18.
Figure 18:
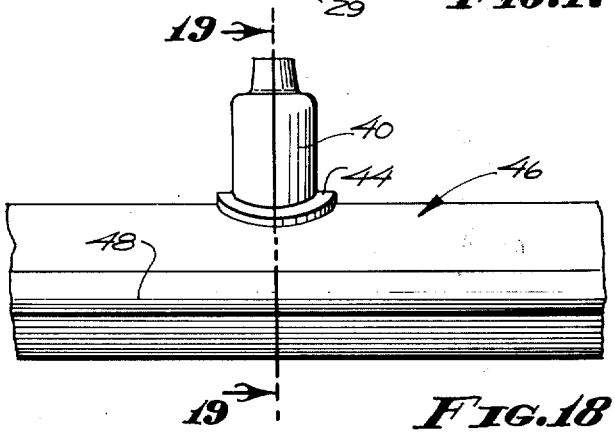
FIG. 18 is a fragmentary side view of a supply line showing a single self-flushing valve unit projecting therefrom.

Reference is now directed to FIGS. 18 and 19. In some cases, a single valve may be encased. This is accomplished by providing a small circular base 39 for the valve 1 or its equivalent having a single aperture. The base is received in a cylindrical outer shell 40 having an end closed except for a perforation 41 communicating with a distributor line socket 42, if a distributor line is needed. Cemented in the outer shell is an inner shell 43 which retains the periphery of the base 39. The common ends of the shells have confronting flanges 44 and 45.

One manner of use of the single valve assembly is to mount the assembly in the wall of a plastic tube 46 which may be flexible or rigid. Initially the tube is open and provided with a series of perforations to receive a series of inner shells 43 over which the outer shells 40 are fitted. The shells are cemented together and the flanges 44 and 45 are cemented to the tube 46. The tube itself may be closed in various manners; for example, the tube may be an extrusion with interlocking margins 47 and 48 which are cemented or heat fused together.

Figure 20:
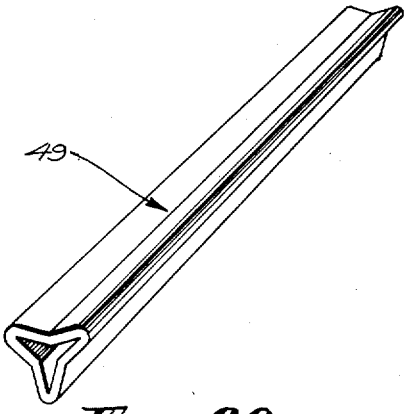
FIG. 20 is a perspective view showing an embodiment of the self-flushing valve formed as an extrusion.
Figure 21:
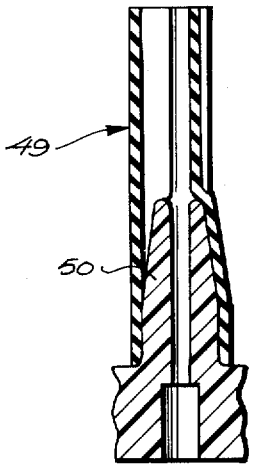
FIG. 21 is a longitudinal sectional view of an extruded valve fitted on a mounting pin.

Reference is now directed to FIG. 20 which illustrates an extruded valve 49 having a cross section similar to the valve 1. This construction is intended to be fitted over a tubular mounting boss 50, shown in FIG. 21.

Figure 22:
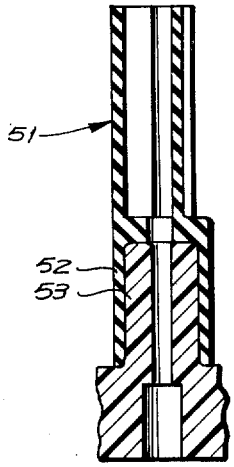
FIG. 22 is a similar sectional view showing a molded valve having an end sleeve and also fitted on a mounting pin.

Reference is directed to FIG. 22 which illustrates a self-flushing valve 51 which may take the form of the previously described valve, but which is joined to a cylindrical base 52 so as to fit over a cylindrical boss 53.

Figure 23:
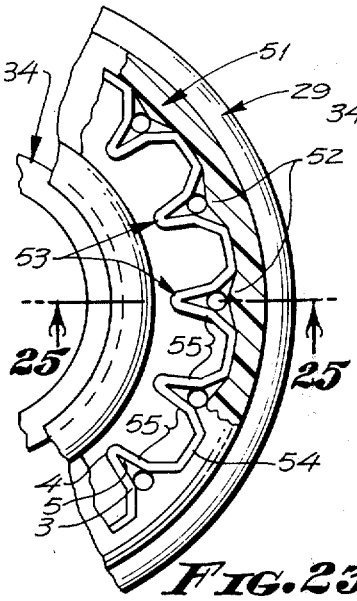
FIG. 23 is an enlarged fragmentary transverse sectional view taken through 23—23 of FIG. 25 of the type of valve assembly shown in FIG. 14, but showing a modified embodiment of the self-flushing valve elements in which a portion of a housing wall forms a part of each valve unit, the valves being shown in their flushing condition.
Figure 24:
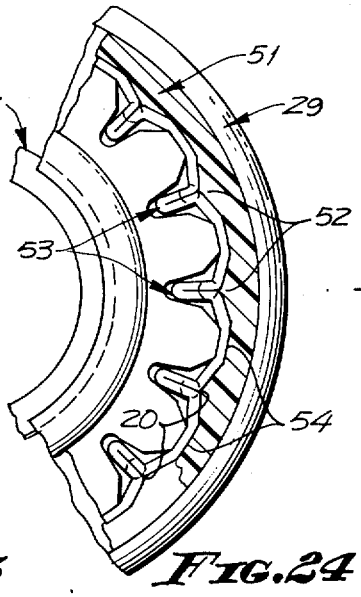
FIG. 24 is a fragmentary transverse sectional view thereof taken through 24—24 of FIG. 25 showing the valves in their trickle condition.
Figure 26:
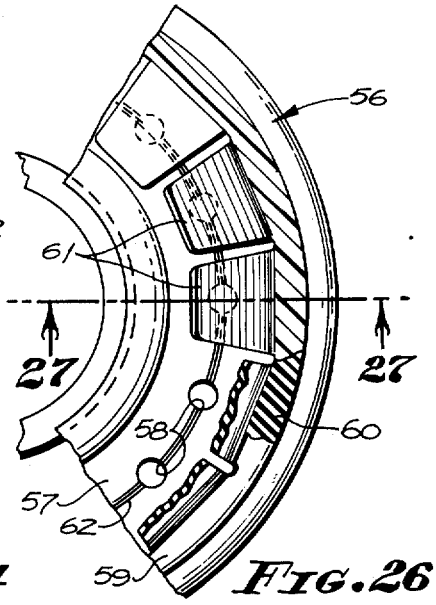
FIG. 26 is an enlarged fragmentary transverse sectional view taken through 26—26 of FIG. 27, and showing a further modified self-flushing valve assembly essentially the type shown in FIG. 14.
Figure 25:
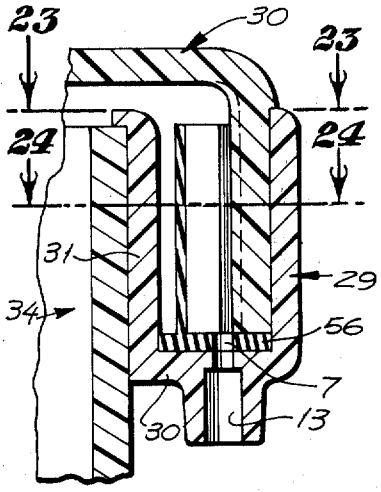
FIG. 25 is a fragmentary longitudinal sectional view thereof taken through 25–25 of FIG. 23.

Reference is now directed to FIGS. 23, 24 and 25. The valve assembly here shown is an alternative to the valve as shown in FIGS. 14 through 17, and utilizes modifications of the housings 29 and 33. In this embodiment, the cylindrical wall of the cover housing 33 forms a part of each self-flushing valve. More particularly, the cover housing 33 is provided with a cylindrical wall 51, the inner surface of which is provided with a plurality of axially extending ribs 52 each defining an obtuse angle corresponding to the angle 3 of the valve 1.

In place of the set of valves 1, a set of self-flushing valves 53 are formed in part by a single, essentially cylindrical wall 54 of elastomeric material confronting the wall 51 and completed by the ribs 52. More specifically, the wall 54 is provided with a radially inwardly converging pair of wall strips 55 confronting each rib 52. Each wall strip is formed of two obtusely related portions and thus are similar to the walls 2 of the valve 1, including the obtuse angles 3. Each pair of converging strips 55 also form a rounded apex 4 and internal apex 5. Each pair of wall strips 55 and corresponding rib 52 forms a flushing passage similar to that of a valve 1 as shown in FIG. 23. The wall 54 is molded integrally with a ring 56 similar to the ring 28. The ring is provided with exit apertures 7 in alignment with the flushing passages.

The flushing valves 53 function the same as the valves 1; that is, below a preselected critical pressure differential between the pressure internally of the valves 53 and the surrounding chamber, the valves remain in their flushing condition. At the critical pressure they close as shown in FIG. 24 to form trickle passages 20 which, in this case, it will be noted are tangent to the radially outer margins of the apertures 7.

Reference is now directed to FIGS. 26 through 29. The embodiment of the valve assembly here illustrated is also related to the construction shown in FIGS. 14 through 17. An annular housing 56 is provided, corresponding to the housing 29. The housing 56 includes an annular base wall forming in part an annular valve face 57 having a ring of valve ports 58 corresponding to the apertures 7. At one radial side is a channel 59 which receives a rim 60 of elastomeric material to which is integrally attached a set of radially directed flap valves 61 which are molded to the rim in such a manner as to be biased in an upwardly inclined position over corresponding ports 58. The flap valves are quite close together so that flushing flow through the valve ports will, when the pressure differential overcomes the biasing force in the hinged connections with the rim 60, snap the flap valves shut. Conversely, when the pressure differential drops below a critical value, the flap valves return to their flushing condition.

Figure 28:
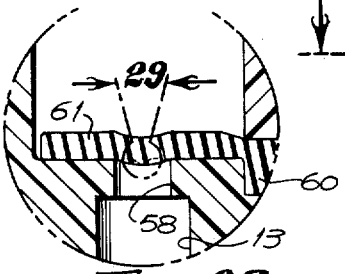
FIG. 28 is a further enlarged fragmentary sectional view taken within circle 28 of FIG. 27 and showing a valve in its trickle flow condition.
Figure 29:
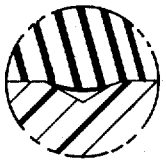
FIG. 29 is a still further enlarged fragmentary sectional view taken within circle 29 of FIG. 28 but offset rearwardly of the plane represented by FIG. 28.
Figure 27:
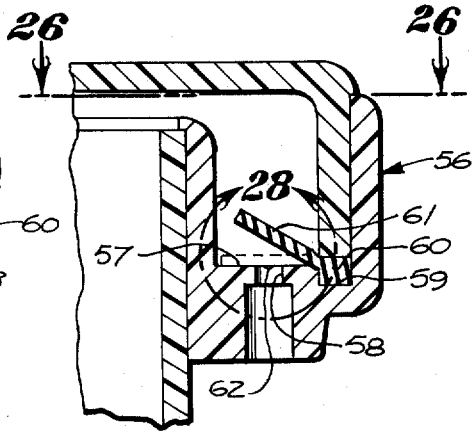
FIG. 27 is a fragmentary longitudinal sectional view thereof taken through 27—27 of FIG. 26, showing a valve by solid lines in its flushing flow condition, and by dotted lines in its trickle flow condition.

Formed in the valve face 57 are one or more trickle channels 62 which have, preferably, obtusely related walls so as to be relatively broad with respect to their depth. This configuration enables the flap valve to depress therein in proportion to line pressure as indicated in FIG. 29 to effect a constant flow condition. However, this same effect is accomplished to some degree as the flap valves 61 are depressed into the valve ports 58, as indicated in FIG. 28. Alternatively, the trickle passage or passages may be formed in the flap valves and constant flow control may be attained as discussed in connection with FIG. 9.

It should be noted that the representations in the drawings of the trickle passages or channels need to be exaggerated in order to be illustrated, as they represent passages which may have an effective diameter as small as 0.005 inches for flow in the order of a gallon per hour at a line pressure in the order of 50 pounds per square inch, and range upward to 0.030 inches depending on the number of gallons per hour desired.

Figure 30:
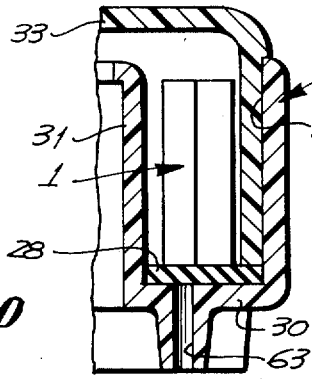
FIG. 30 is an enlarged fragmentary sectional view taken through 30—30 of FIG. 14 and illustrates an anti-syphon valve in its closed condition.
Figure 31:
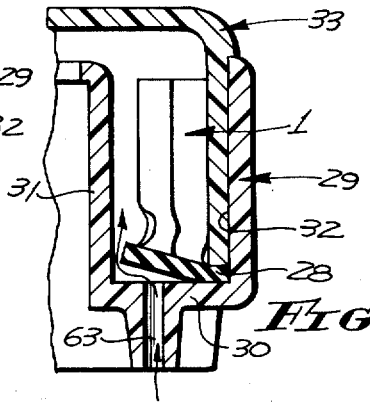
FIG. 31 is a similar sectional view showing the anti-syphon valve in its open position.

Reference is now directed to FIGS. 30 and 31 which illustrates a modification of FIG. 14 in which a ring of anti-syphon valve ports 63 are arranged in the base 30 under the base ring 28. The base ring is yieldable to negative pressure in the valve to deflect upwardly and open the anti-syphon valves. Thus, with minimal increase in cost an anti-syphon effect may be attained, eliminating the need for separate anti-syphon valves.

In a previous comment referring to the valve 1, it was noted a 1/16 inch flushing port is provided in a 1¼ inch valve. It should be noted that the side walls 2 are, during low pressure flushing periods, outwardly expandable to pass large particles. Thus, if the apertures and distributor line passages downstream of the valve are made, effectively, as large as the expanded valve tube, materially larger particulate matter can be passed through the self-flushing valve.

While particular embodiments of this invention have been shown and described, it is not intended to limit the same to the details of the constructions set forth, but instead, the invention embraces such changes, modifications and equivalents of the various parts and their relationships as come within the purview of the appended claims.

I claim:

1. A self-flushing valve for disposition in a chamber, the chamber being subjected periodically to fluid under pressure whereby, on initiation of a pressure period, the fluid pressure progressively rises from a minimum pressure to a maximum pressure and, on termination of the pressure period, the fluid pressure progressively falls from its maximum pressure to the minimum pressure, the self-flushing valve comprising:

a. means forming an exit port in the chamber and, on flow of fluid therethrough, creating in its vicinity, a region of reduced pressure;

[ b. and valve means including at least one flexible wall formed of elastomeric material having a first surface subjected to the fluid pressure in the chamber as supplied thereto, and an opposing surface exposed to the pressure as reduced in the vicinity of the exit port;

c. the wall being yieldably biased, when the difference between the chamber pressure and reduced pressure is below a predetermined value to occupy a position permitting flushing flow of liquid through the exit port and outlet;

d. the wall being movable, when the difference between said pressures exceeds said predetermined value, to throttle the exit port;

e. and the wall, when in its throttling position defining at least in part, a trickle passage forming an entrance to the exit port. ]

*b. and a tubular valve means including confronting wall elements defining an exit end and an entrance end displaced axially from the exit end, the interior of the valve means being exposed to said region of reduced pressure and including opposed wall elements, at least one of which is formed of elastomeric material adapted to occupy a first position forming with the other wall elements, an axially extending flush passage discharging through the chamber exit port, and a second position collapsed toward the other wall elements to form therewith a trickle passage of substantially reduced cross-sectional area;* c. *the flexible wall element being responsive to increase of the pressure differential in the chamber and the flush passage above a predetermined value to cause movement of the wall element from its first position to its second position thereby converting the flush passage to a trickle passage;* d. *the flexible wall element exerting a counterforce, when in its second position, tending to return the wall element to its first position, and being movable from its second position to its first position upon reduction of the pressure differential in the chamber and trickle passage below said predetermined value.*

2. A self-flushing valve as defined in claim 1, wherein:

[ a. the wall is part of a tubular member extending into the chamber from the exit port and providing a plurality of said walls forming, when in their biased condition, a flushing passage preceding the exit port, and mutually collapsible to form said trickle passage.]

a. *a plurality of flexible wall elements are provided and are mutually collapsible to form said trickle passage.*

3. A self-flushing valve as defined in claim 1, wherein:

a. the valve means includes a rigid wall *element* confronting the flexible wall *element*, [ the ] *said* wall *elements* [ *being complementary* ] *complementing each other* to form the flushing passage or the trickle passage.

[ 4. A self-flushing valve as defined in claim 1, wherein:

a. a valve seat surrounds the entrance end of the exit port;

b. the wall is a flap member biased to an angular position, clearing the valve seat for flushing flow of fluid and yieldably movable into engagement with the valve seat to throttle the exit port;

c. and the trickle passage is a groove defined between the flap and the valve seat when the flap is in its throttling position.]

5. A self-flushing valve as defined in claim 1, wherein:

a. [ portions of the ] *said flexible* wall element [ of the trickle passage are contrictable ] *is yieldable* in *direct* response to increasing pressure in the chamber above said predetermined value [ thereby tending ] to maintain a *substantially* constant rate of trickle *flow through the outlet over a relatively wide range of pressure variations in the chamber.*

6. A self-flushing valve for controlling flow from a periodically pressurized fluid system wherein fluid pressure progressively rises from a minimum pressure to a maximum pressure on initiation of a pressure period and progressively falls from the maximum pressure to the minimum pressure on termination of the pressure period, the self-flushing valve comprising:

a. housing means defining a chamber having a major inlet communicating with the fluid system and a minor outlet for the discharge of fluid from the system;

b. and a tubular valve formed, at least in part, of elastomeric material disposed in the chamber, one end thereof being in communication with the outlet, and the other end thereof positioned to receive fluid through the inlet for flow within the tubular valve to the outlet;

c. at least portions of the walls of the [ tube ] *tubular valve* being in confronting relation and forming outer surfaces exposed to pressure of the fluid in the chamber surrounding the valve, and inner surfaces exposed to the reduced pressure incidental to flow of fluid through the valve and outlet;

d. said walls being biased, when the pressure differential across the walls is below a preselected value, to maintain the tubular valve in a condition for flushing said value, said walls being collapsible toward each other to reduce the flow therethrough to a trickle flow;

e. the tubular valve on reduction of pressure differential across said walls, tending to return to a condition of flushing flow, whereby the tubular valve assumes a flushing condition at the beginning and end of each pressure period.

7. A self-flushing valve as defined in claim 6, wherein:

a. the tubular valve is polygonal in cross section, each side having obtusely related walls confronting like walls and defining, when the valve is in its flushing flow condition, a central bore with radiating channels, and defining, when the valve is in its trickle flow condition, a minute central passage.

8. A self-flushing valve as defined in claim 6, wherein:

a. the tubular valve is formed by a pair of walls [ joined at their margins ], the midportions of the walls being spaced from each other when the valve is in its flushing flow condition, and in mutual contact when the valve is in its trickle flow condition, at least one of the walls having a minute flow channel forming with the other wall, a passageway to effect the trickle flow condition.

9. A self-flushing valve as defined in claim 6, wherein:

a. the tubular valve is polygonal in cross section and at least one trickle flow channel extends along at least one of the walls, the inner surfaces of the walls being spaced from each other when the valve is in its flushing flow condition, and being in mutual contact when the valve is in its trickle flow condition except for the trickle flow channel and covering portion of a confronting wall.

10. A self-flushing valve as defined in claim 6, wherein:

a. the chamber is annular and the housing means receives a centrally disposed supply tube;

b. a set of tubular valves is joined to and extends axially from a common base ring surrounding the supply tube.

11. A self-flushing valve as defined in claim 10, wherein:

a. each tubular valve includes a longitudinally faceted fixed wall forming a circular wall of the chamber, and a pair of confronting faceted yieldable walls defining with the fixed wall a generally triangular flushing passage, the walls being mutually engageable with each other and with the fixed wall to close the flushing passage to a trickle passage.

12. A self-flushing valve as defined in claim 6, which further includes:

a. an anti-syphon valve *causing* admission of air into the chamber on generation of a negative pressure therein.

13. A self-flushing valve as defined in claim 6, wherein:

a. said walls are further yieldable after forming the trickle passage to cause shrinking of the trickle passage with increased pressure differential thereby tending to produce constant trickle flow with change in supply pressure in the range above said preselected value.

14. A self-flushing valve as defined in claim 6, wherein:

a. the housing means includes a pair of complementary cylindrical housing members, one axial end thereof being adapted for connection to a supply line and forming the inlet to the chamber, the opposite axial end having *a plurality of* said outlet *outlets* ;

b. and a [ single ] *ring of* tubular valve means is disposed axially in the chamber.

15. A self-flushing valve as defined in claim 6, wherein:

a. the housing means includes a pair of complementary cylindrical housing members, one axial end thereof being adapted for connection to a supply line and forming a centrally disposed inlet, the chamber being annular and surrounding the inlet;

b. at least one axial end of the housing means having a ring of said outlets;

c. a set of the tubular valves are arranged in a circle and are joined to a common base ring having apertures communicating between the valves and said outlets;

d. and a set of distributor tubes are secured in the housing means outlets.

16. A self-flushing valve, comprising:

a. means defining an outlet port surrounded by a valve seat;

b. a flap valve element for the valve port formed of elastomeric material;

c. means sealing clamping the flap valve by one margin at one side of the valve seat;

d. the valve element forming adjacent the clamping means on integral hinge element, the hinge element being yieldably biased to hold the valve element on an angular relation to the port to permit flushing flow of fluid between the valve element and valve seat and out the port, the hinge element being yieldable and the valve element being of sufficient area to cooperate with the valve seat so as to create a predetermined pressure differential caused by flushing flow through the port to close upon the valve seat;

e. the valve seat and flap valve element defining therebetween a trickle flow passage operable upon closure of the flap valve element upon the valve seat element.

17. A self-flushing valve as defined in claim 16, wherein:

a. the valve element when closed relative to the other valve seat to produce trickle flow is yieldable to pressure changes to effect corresponding change in the area of the trickle flow passage, thereby tending to produce constant trickle flow of fluid through a range of fluid pressures.

18. A self-flushing valve, comprising:

a. tubular member having an inlet at one end and an outlet at its other end;

b. the tubular member including a plurality of side walls normally disposed in angular relation and joined longitudinally to form alternately, longitudinally extending acute apeces and obtuse apeces and collectively defining an internal flushing passage for fluid communicating between said inlet and outlet;

c. the side wall being resiliently yieldable in response to a predetermined pressure differential between their outer surfaces and inner surfaces to collapse inward into mutually sealing relation;

d. and trickle passage means for fluid formed at their obtuse apeces when the side walls are in their collapsed condition and communicating between said inlet and outlet.

19. A self-flushing valve as defined in claim 18, wherein:

a. the trickle passage means being constrictible in response to increased external pressure to maintain substantially constant flow of fluid therethrough.

*20. A self flushing valve for disposition in a fluid passageway, the passageway being subjected periodically to fluid under pressure whereby, on initiation of a pressure period the fluid pressure progressively rises from a minimum pressure to a maximum pressure, and on termination of the pressure period, the fluid pressure progressively falls from its maximum pressure to its minimum pressure, the self flushing valve comprising:*

*a. valve means including a pair of mutually confronting wall elements normally spaced to form a flush flow passage having a major transverse dimension and a minor transverse dimension, the flush flow passage having a first end forming an entrance end communicating with the fluid passageway and a second end disposed longitudinally therefrom forming an outlet end, the flush flow passage creating on fluid flow therethrough a region or reduced pressure;*

*b. at least one of the wall elements being formed of elastomeric material having a first surface exposed to fluid pressure in the fluid passageway and a second surface subjected to the region of reduced pressure in the flush flow passage to cause collapse toward the other wall element to close the flush flow passage upon increase of fluid pressure above its minimum pressure;*

*c. the flexible wall element exerting a counterforce tending to cause separation from the other wall element upon approach of the fluid pressure towards its minimum pressure to cause a final flush flow between the wall elements;*

*d. and the wall elements including confronting portions forming a trickle passage therebetween upon closure of the flush flow passage for trickle flow from the fluid passageway to the outlet.*

*21. A self flushing valve comprising:*

*a. means forming a fluid passageway, the passageway being subjected periodically to fluid under pressure whereby, on initiation of a pressure period, the fluid pressure progressively rises from a minimum pressure to a maximum pressure, and on termination of the pressure period, the fluid pressure progressively falls from its maximum pressure to its minimum pressure;*

*b. valve means including a pair of mutually confronting wall elements normally spaced to form a flush flow passage having a major transverse dimension and a minor transverse dimension, the flush flow passage having a first end forming an entrance end communicating with the fluid passageway and a second end disposed longitudinally therefrom forming an outlet end, the flush flow passage creating on fluid flow therethrough a region of reduced pressure;*

*c. at least one of the wall elements being formed of elastomeric material having a first surface exposed to fluid pressure in the fluid passageway and a second surface subjected to the region of reduced pressure in the flush flow passage to cause collapse toward the other wall element to close the flush flow passage upon increase of fluid pressure above its minimum pressure;*

*d. at least one of the wall elements having at least one groove of preselected dimension forming, upon closure of the flush passage, a trickle passage, the trickle passage undergoing constriction as the fluid pressure increases thereby to produce an essentially constant rate of trickle flow through a range of fluid pressure;*

*e. the flexible wall element exerting a counterforce tending to cause separation from the other wall element upon approach of the fluid pressure towards its minimum pressure to cause a final flush flow between the wall elements.*

*22. A self flushing valve, as defined in claim 21, wherein:*

*a. both wall elements are flexible and mutually collapse toward each other to close the flush passage and form the trickle passage.*

*23. A self flushing valve, as defined in claim 21, wherein:*

*a. upon collapse of the flush flow passage, the entrance end of the trickle passage coincides with the entrance end of the flush flow passage.*

* * * * *